(12) United States Patent  (10) Patent No.: US 7,505,214 B2
Hamano et al.  (45) Date of Patent: Mar. 17, 2009

(54) ZOOM LENS AND IMAGE PICKUP APPARATUS HAVING THE SAME

(75) Inventors: Hiroyuki Hamano, Koga (JP); Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 11/677,595

(22) Filed: Feb. 22, 2007

(65) Prior Publication Data

US 2007/0253074 A1  Nov. 1, 2007

(30) Foreign Application Priority Data

Apr. 27, 2006  (JP) .............................. 2006-124052

(51) Int. Cl.
*G02B 15/14* (2006.01)
(52) U.S. Cl. ...................... 359/689; 359/676
(58) Field of Classification Search .................. 359/676, 359/680–706
See application file for complete search history.

(56) References Cited

U.S. PATENT DOCUMENTS

| 4,913,535 | A | 4/1990 | Robb |
| 5,132,848 | A | 7/1992 | Nishio et al. |
| 6,594,087 | B2 | 7/2003 | Uzawa et al. |
| 7,088,521 | B2 | 8/2006 | Hamano et al. |
| 7,304,805 | B2 * | 12/2007 | Endo et al. .................. 359/690 |
| 2005/0270661 | A1 * | 12/2005 | Nanba et al. ................ 359/676 |

* cited by examiner

*Primary Examiner*—Darryl J Collins
(74) *Attorney, Agent, or Firm*—Canon USA Inc IP Division (57) ABSTRACT

At least one exemplary embodiment is directed to a zoom lens includes a first lens unit having a positive refractive power, a second lens unit having a negative refractive power, and an image-side lens unit in order from an object side to an image side wherein an interval between the first lens unit and the second lens unit varies during zooming, the first lens unit includes an optical element having a positive refractive power and made of a solid material having an Abbe number (vd) and a relative partial dispersion ($\Theta gF$) satisfying the following conditions:

$$0.755\Theta gF-(-1.665\times10^{-7}\cdot vd^3+5.213\times10^{-5}\cdot vd^2-5.656\times10^{-3}\cdot vd)<1.011$$

and $$1.6<(ft/f1)^2<5.6,$$

wherein f1 is the focal length of the first lens unit and ft is the focal length of the zoom lens at a telephoto end.

6 Claims, 9 Drawing Sheets

ZOOM LENS AND IMAGE PICKUP APPARATUS HAVING THE SAME

BACKGROUND OF THE INVENTION

1. Field of the Invention

The present invention relates to a zoom lens and, more particularly though not exclusively, to a zoom lens suitable as a photographic lens that can be used in image pickup apparatuses.

2. Description of the Related Art

In recent years, technologies for high resolution in image sensors, which can be used in image pickup apparatuses such as digital cameras, have been advanced. Photographic lenses, which can be used in such image pickup apparatuses, can be high-zoom-ratio zoom lenses.

Additionally, the photographic lenses require not only corrections for monochromatic aberration such as spherical aberration and coma aberration but also sufficient corrections for chromatic aberration that may occur when a white light source is used for imaging and that affects chromatic blurs and image resolutions.

In particular, a high-zoom-ratio zoom lens, whose focal length on the telephoto side is long, is useful to reduce a second-order spectrum in addition to first-order achromatism as corrections for chromatic aberration.

A method of using an extraordinary partial dispersion material as an optical material to correct chromatic aberration is discussed in U.S. Pat. Nos. 5,132,848 and 6,594,087.

Also, an optical system using a liquid material exhibiting optical properties of a high dispersion and an extraordinary partial dispersion has been discussed (see U.S. Pat. No. 4,913,535).

Additionally, a zoom lens in which color aberration on the telephoto side is corrected by utilizing a dispersion characteristic of an optical element obtained by dispersing fine indium tin oxide (ITO) particles in a resin has been discussed (see U.S. Pat. No. 7,088,521).

According to the conventional method of correcting chromatic aberration by disposing an extraordinary partial dispersion material, such as a fluorite, in an optical path, if a lens element made of this material does not have an appropriate refractive power or is not disposed at an appropriate location, even when chromatic aberration can be corrected at one of the wide-angle end and the telephoto end, chromatic aberration may be considerably deteriorated at the other of the wide-angle end and the telephoto end.

In a case where a liquid material having an achromatic effect is used, chromatic aberration can easily be corrected. However, a structure adapted to seal the liquid material is needed. A process for manufacturing optical systems tends to be complex. Additionally, a refractive index and a dispersion characteristic of the liquid material vary due to changes in temperature. Thus, it is difficult to maintain good environmental resistance of the optical system.

SUMMARY OF THE INVENTION

At least one exemplary embodiment is directed to zoom lenses that can be used in image pickup apparatuses (e.g., a video camera, a digital still camera, a broadcasting camera, a silver-halide photographing camera, and other image pickup apparatus as known by one of ordinary skill in the relevant arts).

According to at least one exemplary embodiment of the present invention, a zoom lens includes a first lens unit, a second lens unit, and an image-side lens unit arranged in order from an object side to an image side, wherein the first lens unit has a positive refractive power, the second lens unit has a negative refractive power, and an interval between the first lens unit and the second lens unit varies during zooming. The first lens unit includes an optical element having a positive refractive power and made of a solid material having an Abbe number ($\nu d$) and a relative partial dispersion ($\theta gF$) satisfying the following condition:

$$0.755 < \theta gF - (-1.665 \times 10^{-7} \cdot \nu d^3 + 5.213 \times 10^{-5} \cdot \nu d^2 - 5.656 \times 10^{-3} \cdot \nu d) < 1.011.$$

Also, a focal length of the first lens unit (f1) and a focal length of the zoom lens at a telephoto end (ft) satisfy the following condition:

$$1.6 < (ft/f1)^2 < 5.6.$$

According to an exemplary embodiment of the present invention, a zoom lens capable of correcting chromatic aberration well and having excellent optical performance over the entire zooming range can be implemented. Also, according to another exemplary embodiment of the present invention, an image pickup apparatus including such a zoom lens can be implemented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Various exemplary embodiments of the present invention will be described in detail below with reference to the drawings.

Figure 1:
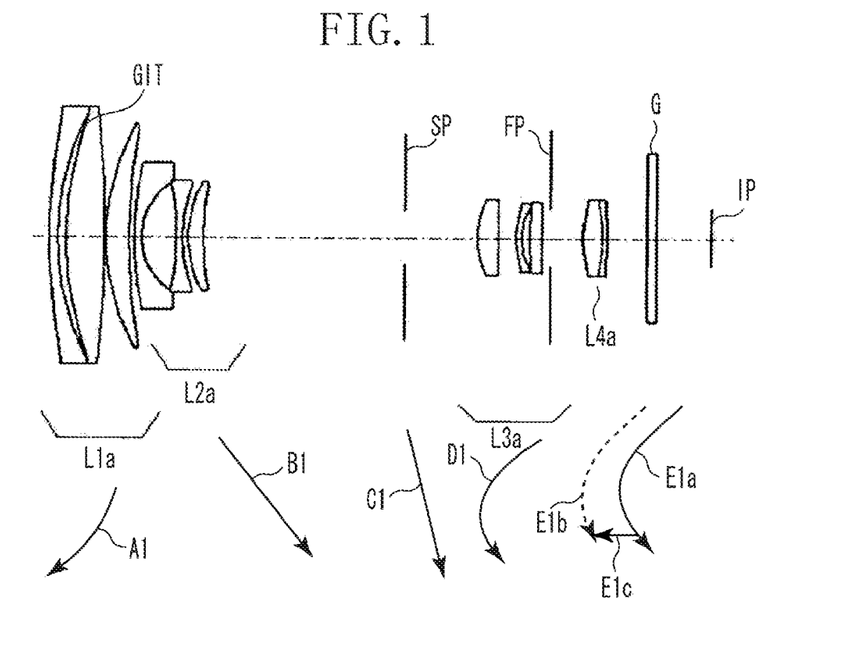
FIG. 1 is a cross-sectional view of a zoom lens at a wide-angle end according to a first exemplary embodiment of the present invention.
Figure 2:
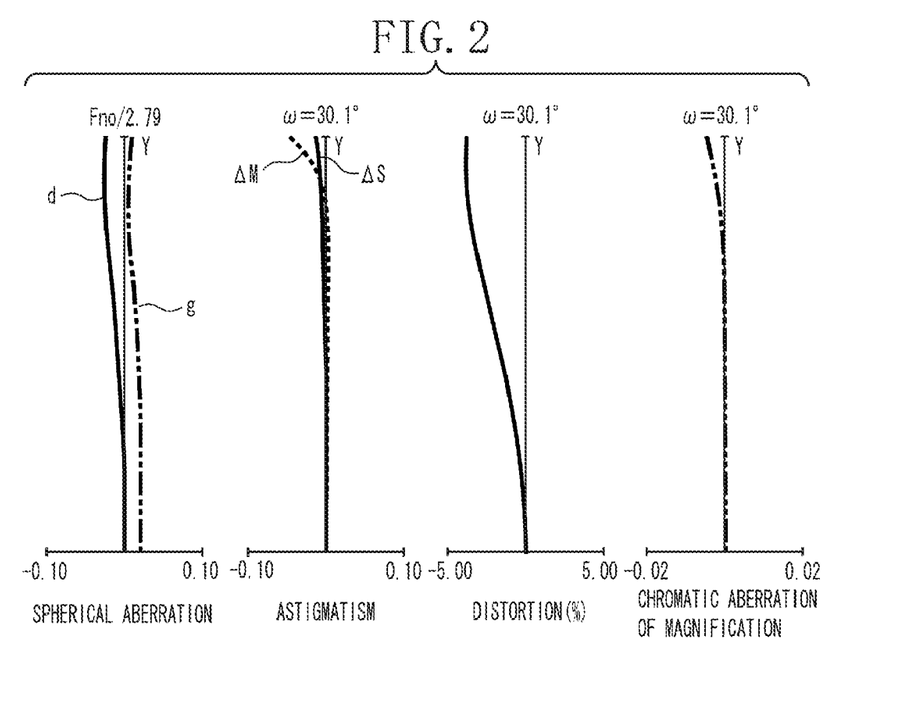
FIG. 2 illustrates aberration diagrams of the zoom lens at the wide-angle end according to the first exemplary embodiment of the present invention.
Figure 3:
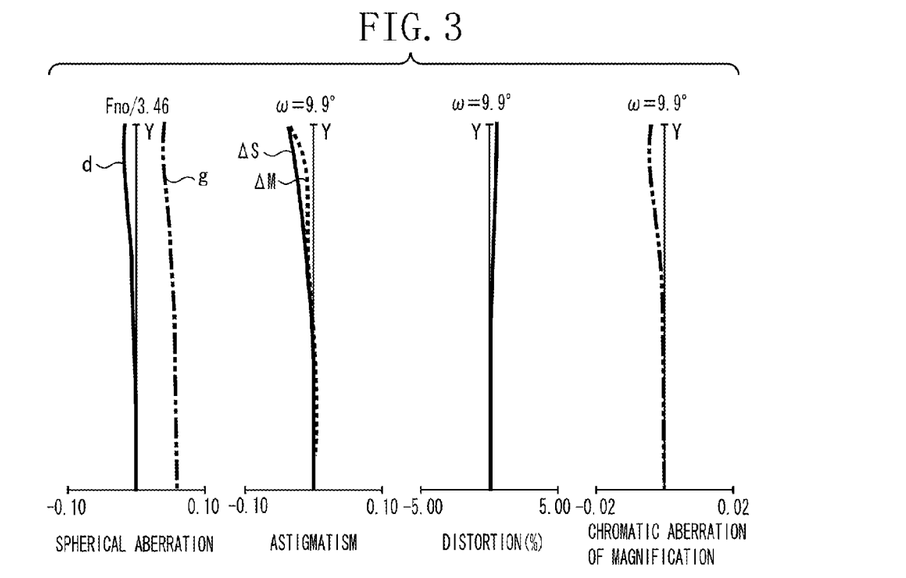
FIG. 3 illustrates aberration diagrams of the zoom lens according to the first exemplary embodiment of the present invention.
Figure 4:
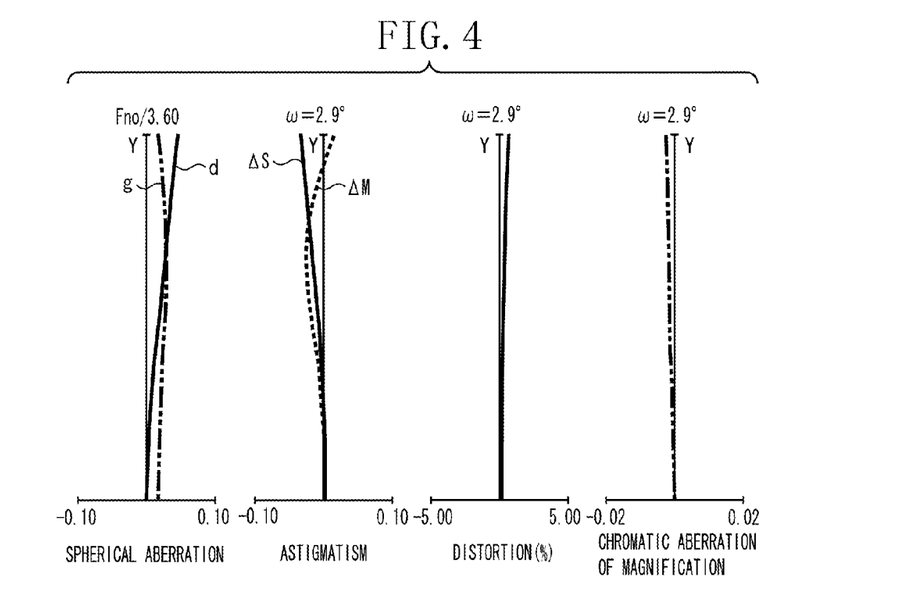
FIG. 4 illustrates aberration diagrams of the zoom lens at a middle zoom position according to the first exemplary embodiment of the present invention at a telephoto end.

FIG. 1 is a cross-sectional view of a zoom lens at a wide-angle end (short focal length end) according to a first exemplary embodiment of the present invention. FIGS. 2, 3, and 4 illustrate aberration diagrams of the zoom lens at the wide-angle end, a middle zoom position, and a telephoto end (long focal length end), respectively, according to the first exemplary embodiment of the present invention.

Figure 5:
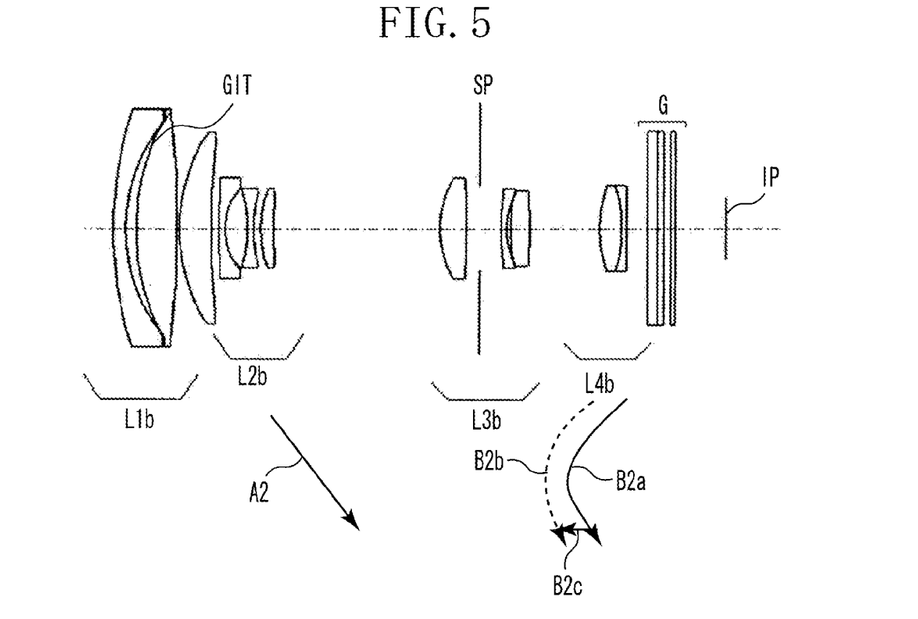
FIG. 5 is a cross-sectional view of a zoom lens at a wide-angle end according to a second exemplary embodiment of the present invention.
Figure 6:
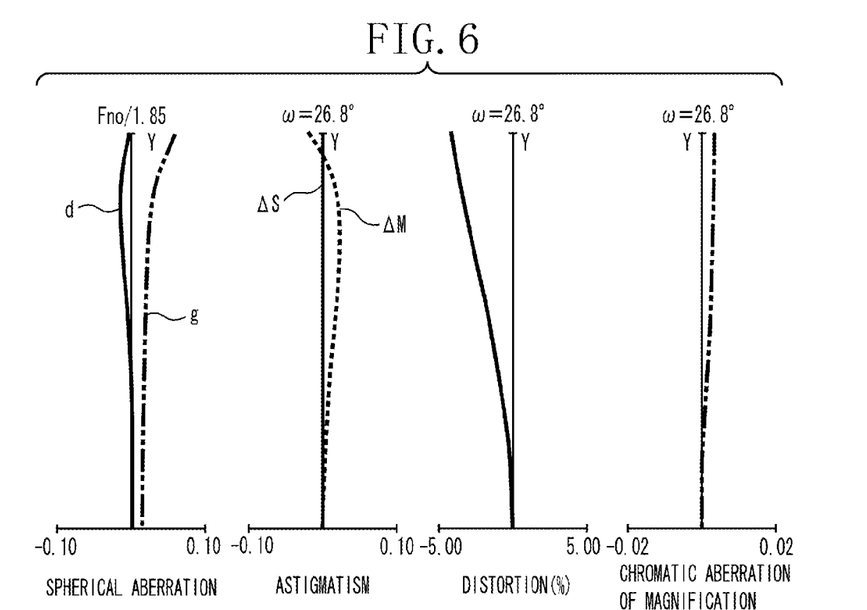
FIG. 6 illustrates aberration diagrams of the zoom lens at the wide-angle end according to the second exemplary embodiment of the present invention.
Figure 7:
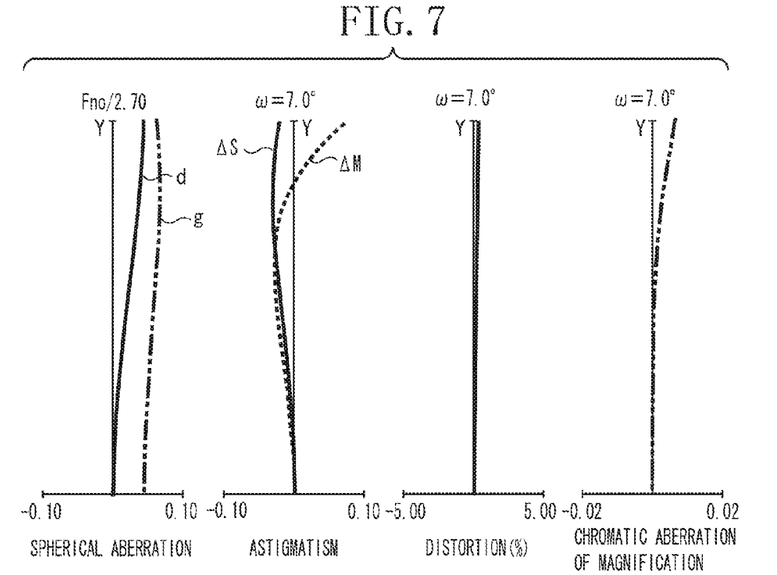
FIG. 7 illustrates aberration diagrams of the zoom lens at a middle zoom position according to the second exemplary embodiment of the present invention.
Figure 8:
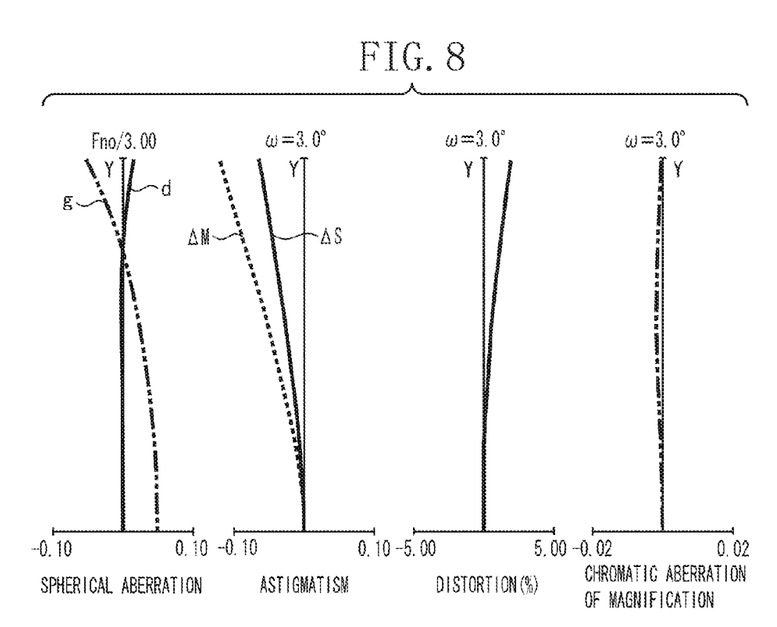
FIG. 8 illustrates aberration diagrams of the zoom lens at a telephoto end according to the second exemplary embodiment of the present invention.

FIG. 5 is a cross-sectional view of a zoom lens at the wide-angle end according to a second exemplary embodiment of the present invention. FIGS. 6, 7, and 8 illustrate aberration diagrams of the zoom lens at the wide-angle end, the middle zoom position, and the telephoto end, respectively, according to the second exemplary embodiment of the present invention.

Figure 9:
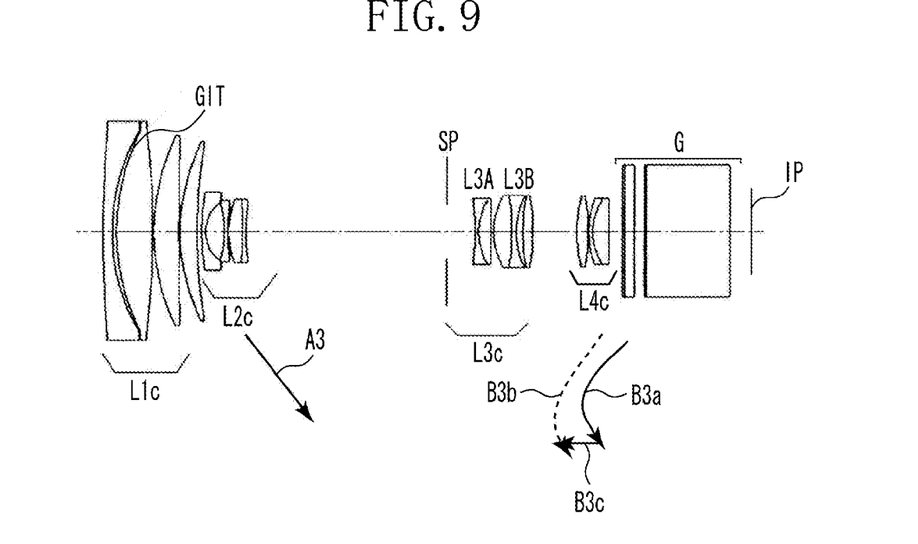
FIG. 9 is a cross-sectional view of a zoom lens at a wide-angle end according to a third exemplary embodiment of the present invention.
Figure 10:
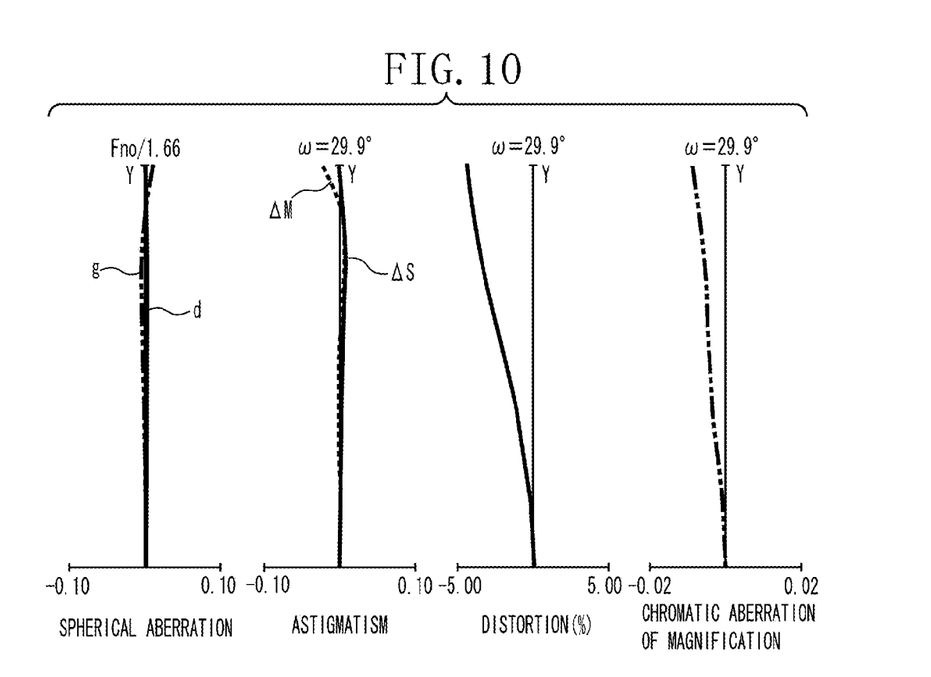
FIG. 10 illustrates aberration diagrams of the zoom lens at the wide-angle end according to the third exemplary embodiment of the present invention.
Figure 11:
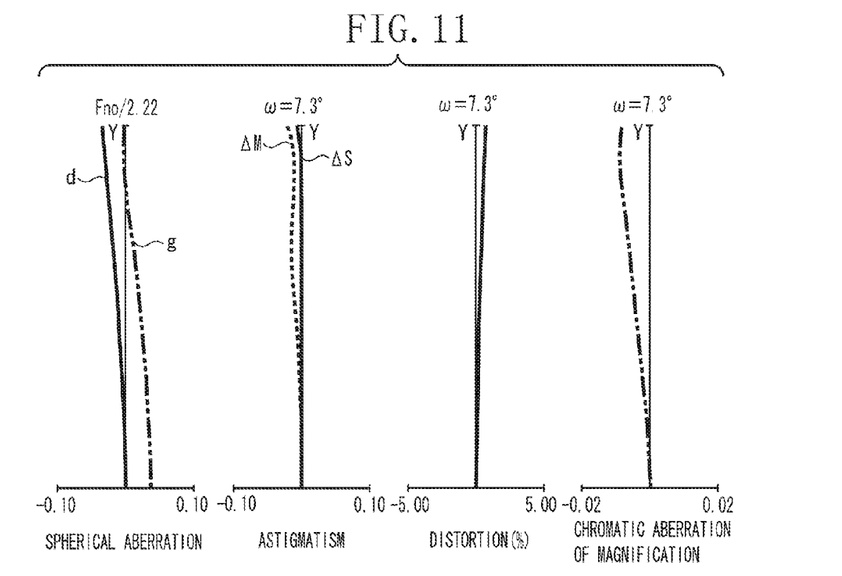
FIG. 11 illustrates aberration diagrams of the zoom lens at a middle zoom position according to the third exemplary embodiment of the present invention.
Figure 12:
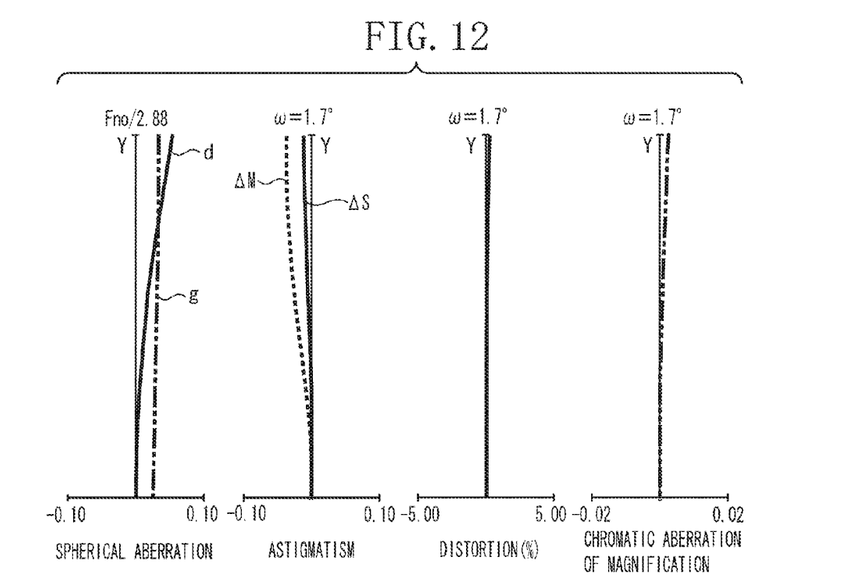
FIG. 12 illustrates aberration diagrams of the zoom lens at a telephoto end according to the third exemplary embodiment of the present invention.

FIG. 9 is a cross-sectional view of a zoom lens at the wide-angle end according to a third exemplary embodiment of the present invention. FIGS. 10, 11, and 12 illustrate aberration diagrams of the zoom lens at the wide-angle end, the middle zoom position, and the telephoto end, respectively, according to the third exemplary embodiment of the present invention.

Figure 13:
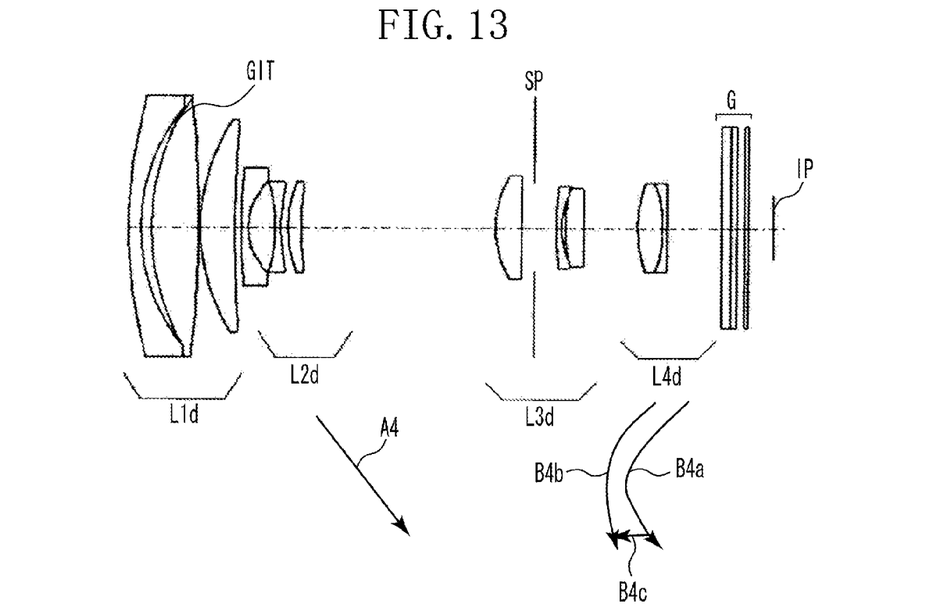
FIG. 13 is a cross-sectional view of a zoom lens at a wide-angle end according to a fourth exemplary embodiment of the present invention.
Figure 14:
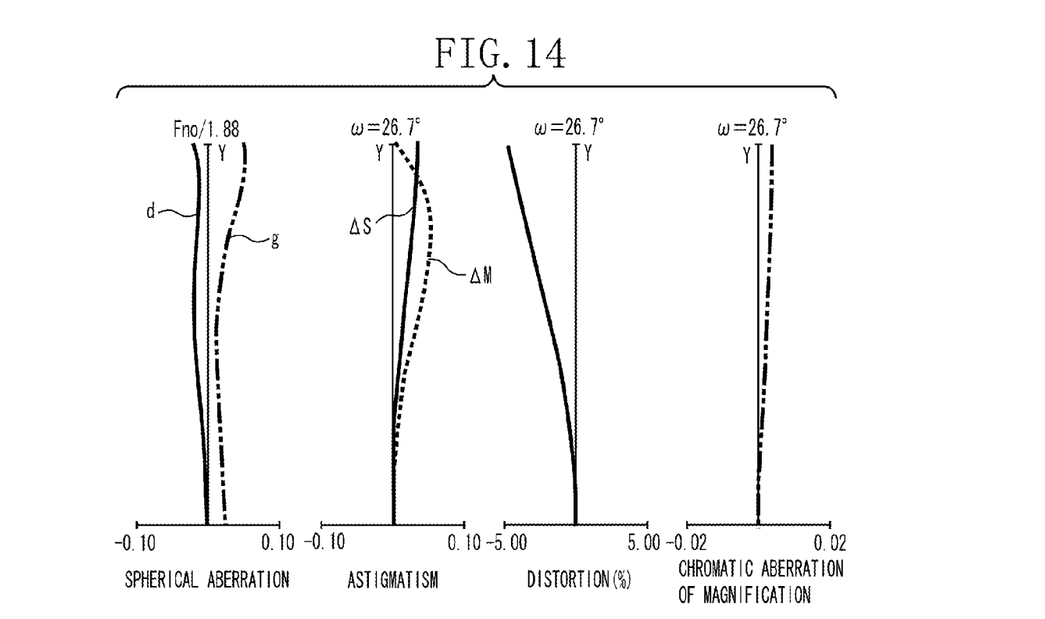
FIG. 14 illustrates aberration diagrams of the zoom lens at the wide-angle end according to the fourth exemplary embodiment of the present invention.
Figure 15:
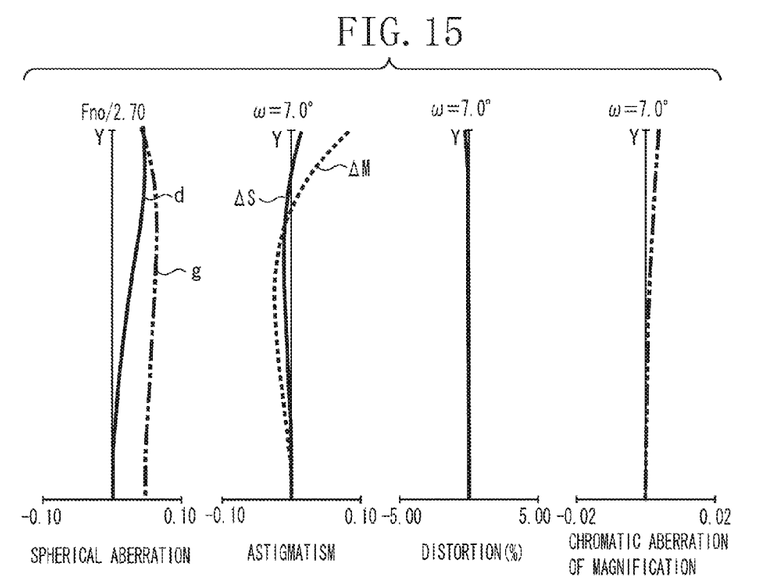
FIG. 15 illustrates aberration diagrams of the zoom lens at a middle zoom position according to the fourth exemplary embodiment of the present invention.
Figure 16:
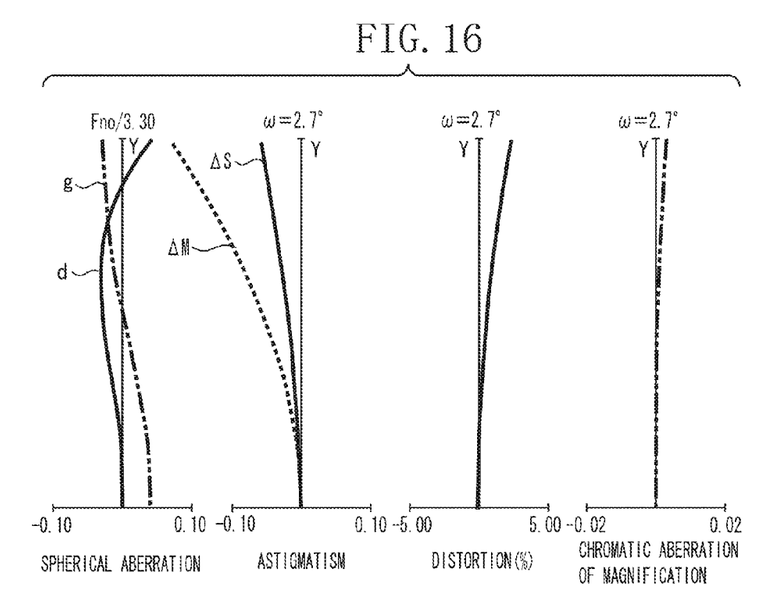
FIG. 16 illustrates aberration diagrams of the zoom lens at a telephoto end according to the fourth exemplary embodiment of the present invention.

FIG. 13 is a cross-sectional view of a zoom lens at the wide-angle end according to a fourth exemplary embodiment of the present invention. FIGS. 14, 15, and 16 illustrate aberration diagrams of the zoom lens at the wide-angle end, the middle zoom position, and the telephoto end, respectively according to the fourth exemplary embodiment of the present invention.

Figure 17:
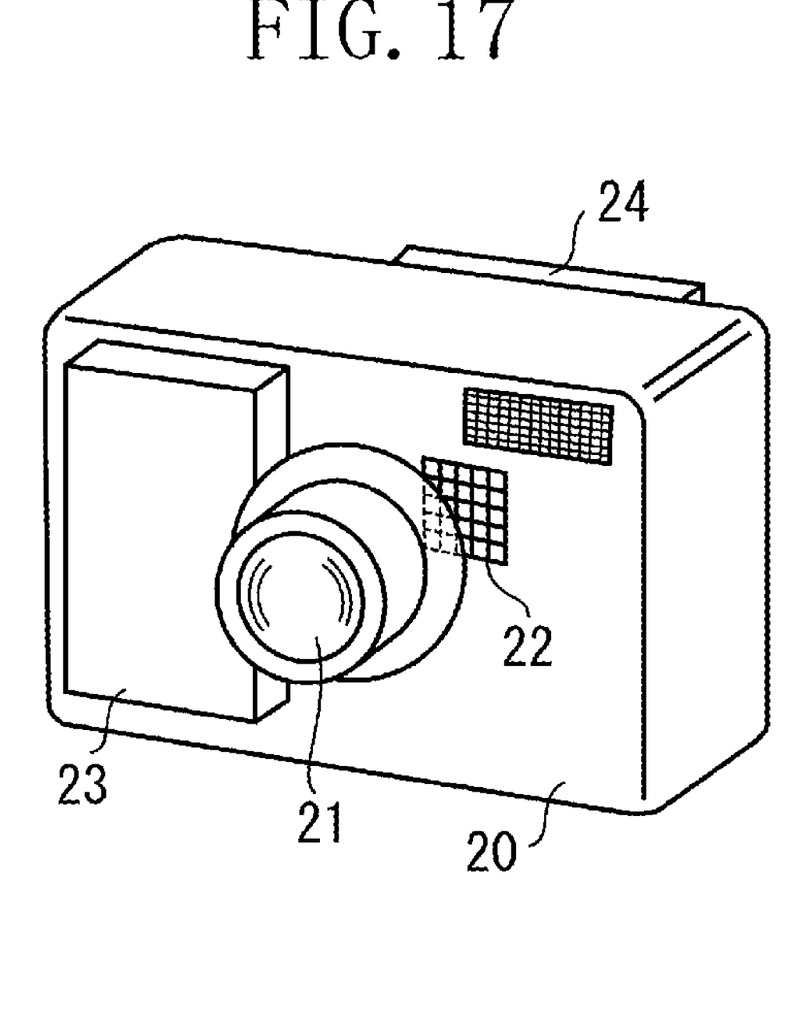
FIG. 17 is a diagram illustrating components of an image pickup apparatus according to an exemplary embodiment of the present invention.

FIG. 17 is a diagram illustrating components of a camera (image pickup apparatus) having a zoom lens according to an exemplary embodiments of the present invention.

The zoom lens according to at least one of the exemplary embodiments of the present invention is a photographic lens that can be used in image pickup apparatuses, such as a video camera, a digital camera, and a silver-halide film camera.

As viewed in each of the cross-sectional views of the zoom lens, the left side is an object side (front side), while the right side is an image side (rear side). As illustrated in each of the cross-sectional views of the zoom lens, the zoom lens includes lens units Li ("i" designates the ordinal number of each of the lens units from the object side). Therefore, Li represents an i-th lens unit. The zoom lens also includes an aperture stop SP, an optical block G, and a flare stop FP. The optical block G is, for example, an optical filter, a face-plate, a crystal low-pass filter, or an infrared cut filter.

An image plane IP corresponds to an imaging plane of a solid-state image sensor (photoelectric conversion element), such as a CCD (charge-coupled device) sensor or a COMS (complementary metal-oxide semiconductor) sensor, when the zoom lens is used as a photographing optical system of a video camera or a digital still camera. Alternatively, the image plane IP corresponds to a film plane when the zoom lens is used as a photographing optical system of a silver-halide film camera.

In each of diagrams showing a cross section of a zoom lens, arrows indicate a locus of movement of each lens unit during zooming from the wide-angle end to the telephoto end and a locus of movement of each lens unit during focusing.

In each of the aberration diagrams, curves d and g represent d-line and g-line light, respectively. Curves ΔM and ΔS correspond to a meridional image plane and a sagittal image plane, respectively. Chromatic aberration of magnefication is represented with g-line light. The Y-axis in each of graphs showing spherical aberration represents an entrance pupil radius at a predetermined f-number Fno. The Y-axis in each of graphs showing astigmatism, distortion, and chromatic aberration of magnification represents an image height at a predetermined semifield angle ω.

In the following description of each of the exemplary embodiments, the terms "wide-angle end" and "telephoto end" designate zoom positions respectively corresponding to both ends of a range in which a magnification varying lens unit can mechanically move along an optical axis.

According to each of the exemplary embodiments, the zoom lens includes a first lens unit L1a, . . . , or L1d having a positive refractive power, a second lens unit L2a, . . . , or L2d having a negative refractive power, and an image-side lens unit, which are arranged in order from an object side to an image side. When zooming is performed, the interval between the first lens unit L1a, . . . , or L1d and the second lens unit L2a, . . . , or L2d varies.

In at least one of the exemplary embodiments, the image-side lens unit can include a third lens unit L3a, . . . , or L3d having a positive refractive power, and can also include a fourth lens unit L4a, . . . , or L4d having a negative refractive power.

Note that, in at least one of the exemplary embodiments of the present invention, the number of lens units constituting the image-side lens unit is optional. The image-side lens unit includes at least one lens unit. Thus, the zoom lens according to an exemplary embodiment of the present invention includes three or more lens units.

The first lens unit L1a-d includes at least one optical element GIT having a positive refractive power and made of a solid material having an Abbe number (νd) and a relative partial dispersion (θgF) satisfying the following condition:

$$0.755 < \theta gF - (-1.665 \times 10^{-7} \cdot \nu d^3 + 5.213 \times 10^{-5} \cdot \nu d^2 - 5.656 \times 10^{-3} \cdot \nu d) < 1.011. \quad (1)$$

This material is in a solid state in a condition in which the optical system is used.

The optical element GIT, which is made of such an extraordinary dispersion material, is located between a meniscus-shaped negative lens and a positive lens in the first lens unit L1a, . . . , or L1d.

The Abbe number νd and the relative partial dispersion θgF are given by the following equations:

$$\nu d = (nd-1)/(nF-nC)$$

$$\theta gF = (ng-nF)/(nF-nC)$$

where ng, nF, nd, and nC respectively represent refractive indices of the material, which correspond to wavelengths of 435.8 nm (corresponding to g-line), 486.1 nm (corresponding to F-line), 587.6 nm (corresponding to d-line), and 656.3 nm (corresponding to C-line).

The conditional expression (1) indicates wavelength dependence of the refractive index of the solid material used as the material of the optical element GIT.

The optical element GIT having a positive refractive power, which satisfies the condition (1), is provided in the first lens unit L1a, . . . , or L1d. Accordingly, axial chromatic aberration and chromatic aberration of magnification, which occur at the telephoto side, are corrected in a balanced manner.

In a case where the lower limit of the condition (1) is exceeded, the correction of aberration by utilization of the extraordinary dispersion is insufficient. Thus, it can be difficult to correct axial chromatic aberration and chromatic aberration of magnification at the telephoto end. Conversely, in a case where the upper limit of the condition (1) is exceeded, it can be difficult to correct chromatic aberration of magnification at the wide-angle end.

A specific example of the solid material satisfying the condition (1) includes a resin. Among various resins, in particular, an ultraviolet (UV) curable resin (nd=1.635, νd=22.7, θgF=0.69) or an N-polyvinyl-carbazole (nd=1.696, νd=17.7, θgF=0.69) can be used.

Also, mixtures obtained by dispersing fine particles of the following inorganic oxides in synthetic resins are examples of a solid material which differs in characteristics from general glass materials, that is, $TiO_2$ (nd=2.304, νd=13.8), $Nb_2O_5$ (nd=2.367, νd=14.0), ITO (nd=1.8581, νd=5.53), $Cr_2O_3$ (nd=2.2178, νd=13.4), or $BaTiO_3$ (nd=2.4362, νd=11.3).

In a case where fine particles made of $TiO_2$ (nd=2.304, νd=13.8, θgF=0.87) among the inorganic oxides are dispersed into a synthetic resin, an optical material satisfying the condition (1) can be obtained.

$TiO_2$ (nd=2.304, νd=13.8, θgF=0.87) is a material used for various purposes. Regarding optics application, TiO2 is used as a vapor-deposition material for an optical thin film, such as an antireflection film. Additionally, $TiO_2$ is used as materials of a photocatalyst and a white pigment. Also, fine $TiO_2$ particles are used as a material of a cosmetic product. However, there have hitherto been no examples of using a mixture of fine $TiO_2$ particles for correcting chromatic aberration occurring in an optical system.

In consideration of the influence of scattering, an average diameter of the fine $TiO_2$ particles can range from about 2 nm to about 50 nm. To suppress aggregation, for example, a dispersant can be added to the mixture.

A material of a medium in which fine $TiO_2$ particles are dispersed can be a polymer. High mass productivity of the polymer can be obtained by photopolymerization molding or thermopolymerization molding using a forming die.

Additionally, such a polymer has a relatively high relative partial dispersion and/or a relatively small Abbe number as an optical constant characteristic. Examples of such a polymer are N-polyvinyl-carbazole, styrene, and polymethyl-methacrylate (or acrylic). In exemplary embodiments, which will be described later, UV curable resins and N-polyvinyl-carbazole are used as a host polymer in which fine TiO2 particles are dispersed. However, the host polymer is not limited thereto.

According to at least one of the exemplary embodiments, the optical element GIT having extraordinary dispersibility is introduced into the first lens unit L1a, . . . , or L1d of the zoom lens. Thus, chromatic aberration can be corrected well over the entire zooming range. Consequently, optical performance can be enhanced.

At least one of the exemplary embodiments meets the following condition (2):

$$1.6 < (ft/f1)^2 < 5.6 \quad (2)$$

where f1 represents a focal length of the first unit L1a, . . . , L1d, and ft designates a focal length of the zoom lens at the telephoto end.

The condition (2) is defined to miniaturize the zoom lens and to correct chromatic aberration and other aberrations, such as curvature of field, at the telephoto end.

If the lower limit of the condition (2) is exceeded as the focal length of the first lens unit L1a, . . . , L1d is increased, that is, as the refractive power of the first lens unit L1a, . . . , L1d is decreased, this is advantageous to the correction of aberrations. However, the entire length of the zoom lens increases and the diameter of a front lens element increases.

Conversely, if the upper limit of the condition (2) is exceeded as the refractive power of the first lens unit L1a, . . . , or L1d is increased, this is advantageous to the reduction of the entire length of the zoom lens. However, it is difficult to correct axial chromatic aberration at the telephoto end. Also, Petzval's sum becomes too large in a positive direction, so that it becomes difficult to correct curvature of field.

The optical element GIT to be used in at least one of the exemplary embodiments satisfies the following condition (3):

$$5 < fGIT/f1 < 80 \quad (3)$$

where fGIT represents a focal length of the optical element GIT in a case where both of two refractive surfaces of the optical element GIT are in contact with air.

If the lower limit of the condition (3) is exceeded, it becomes difficult to correct chromatic aberration of magnification at the wide-angle end. Also, it becomes necessary to increase the thickness of the optical element GIT. Thus, when the optical element GIT is formed with a resin layer, it is difficult to form the optical element GIT.

If the upper limit of the condition (3) is exceeded, the refractive power of the optical element GIT becomes too low. Thus, the correction of chromatic aberration at the telephoto end becomes insufficient.

The first lens unit L1a, ..., or L1d has a meniscus-shaped negative lens whose image-side surface is concave, an optical element having the above-described characteristic, and a positive lens whose object-side surface is convex, which are arranged in order from the object side to the image side.

Consequently, various aberrations occurring in the first lens unit L1a, ..., or L1d, in particular, spherical aberration at the telephoto end and distortion at the wide-angle end can be corrected well while chromatic aberration is effectively corrected.

Additionally, when the optical element GIT is formed with a replica layer, the optical element GIT is sandwiched by lenses made of glass materials. This is useful for environmental resistance.

Also, the optical element GIT satisfies the following condition (4):

$$-30 < (Ra+Rb)/(Ra-Rb) < -4 \tag{4}$$

where Ra and Rb designate a radius of curvature of an object-side surface and a radius of curvature of an image-side surface of the optical element GIT, respectively.

Consequently, various aberrations occurring in the first lens unit L1a, ..., or L1d can be corrected well.

If the lower limit of the condition (4) is exceeded, spherical aberration increases at the telephoto end in a positive direction. Conversely, if the upper limit of the condition (4) is exceeded, spherical aberration increases in a negative direction.

To correct spherical aberration and curvature of field, it is useful to provide at least one meniscus-shaped positive lens, whose object-side surface is convex, at the image side of the above-mentioned positive lens of the first lens unit L1a, ..., or L1d.

Additionally, in at least one of the exemplary embodiments, the numerical ranges of the conditions (1) to (4) can be set as follows:

$$0.765 < \theta gF - (-1.665 \times 10^{-7} \cdot vd^3 + 5.213 \times 10^{-5} \cdot vd^2 - 5.656 \times 10^{-3} \cdot vd) < 0.900 \tag{1a}$$

$$1.8 < (ft/f1)^2 < 5.2 \tag{2a}$$

$$13 < fGIT/f1 < 50 \tag{3a}$$

$$-20 < (Ra+Rb)/(Ra-Rb) < -6 \tag{4a}$$

First Exemplary Embodiment

In a first exemplary embodiment, during zooming from the wide-angle end to the object side, the first lens unit L1a is moved towards the object side, and the second lens unit L2a is moved towards the image side, as indicated by arrows A1 and B1, respectively.

Also, the third lens unit L3a is moved along a locus D1 convex towards the object side. The fourth lens unit L4a is moved along a locus E1a convex towards the object side to compensate for movement of an image plane caused by the variation of magnification.

Also, the aperture stop SP is moved towards the image side (see arrow C1).

The first exemplary embodiment employs a rear focus system in which focusing is performed by moving the fourth lens unit L4a along the optical axis.

During focusing from an infinitely distant object to a closes object at the telephoto end, the fourth lens unit L4a is moved frontward as indicated by an arrow E1c. A solid curve E1a indicates a movement locus of the fourth lens unit L4a to compensate for movement of an image plane caused by the zooming from the wide-angle end to the telephoto end when focusing is performed on an infinitely distant object. A dashed curve E1b indicates a movement locus of the fourth lens unit L4a to compensate for movement of an image plane caused by the zooming from the wide-angle end to the telephoto end when focusing is performed on a closest object. Moving the fourth lens unit L4a, which is relatively lightweight, facilitates quick focusing.

The movement locus of the fourth lens unit L4a is made to be convex towards the object side. Thus, a space between the third lens unit L3a and the fourth lens unit L4a can effectively be utilized. Also, the reduction of the entire length of the zoom lens can effectively be achieved.

When zooming is performed, the respective lens units are moved such that the first lens unit L1a is located closer to the object side at the telephoto end, as compared with the position thereof at the wide-angle end, that the second lens unit L2a is located closer to the image side at the telephoto end, as compared with the position thereof at the wide-angle end, and that the third lens unit L3a is located closer to the object side at the telephoto end, as compared with the position thereof at the wide-angle end. Consequently, a large zoom ratio can be obtained while the entire length of the zoom lens is maintained at a small value.

In particular, the third lens unit L3a is moved along a locus convex towards the object side. Thus, the diameter of a front lens element can be prevented from being increased to assure marginal light at a middle zoom position. Consequently, the reduction of the diameter of the front lens element can be achieved.

In the following description, lenses and the optical element in each of the lens units are assumed to be arranged in order from the object side to the image side.

The first lens unit L1a includes one negative lens, the optical element GIT, and two positive lenses.

Consequently, chromatic aberration at the telephoto end can effectively be corrected.

The second lens unit L2a includes a meniscus-shaped negative lens whose image-side surface is concave, a negative lens, and a positive lens.

Consequently, variation of various aberrations during zooming can be reduced.

The third lens unit L3a includes a positive lens, a meniscus-shaped negative lens whose object-side surface is convex, and a positive lens.

The fourth lens unit L4a includes a cemented lens including a positive lens and a negative lens.

Second Exemplary Embodiment

In a second exemplary embodiment illustrated in FIG. 5, when zooming from the wide-angle end to the zoom position at the telephoto end is performed, the variation of magnification is performed by moving a second lens unit L2b towards the image side (see arrow A2). Then, the movement of an image plane caused by the variation of magnification is compensated for by moving the fourth lens unit L4b along a part of a locus B2a convex towards the object side.

During zooming and during focusing, a first lens unit L1b and a third lens unit L3b are stationary.

Similarly to the first exemplary embodiment, the second embodiment employs a rear focus system in which focusing is performed by moving the fourth lens unit L4b along an optical axis (see arrows B2a, B2b, and B2c).

In the second exemplary embodiment, the aperture stop SP is located within the third lens unit L3b. Thus, an interval between the second lens unit L2b and the third lens unit L3b can be reduced. Consequently, the entire length of the zoom lens can be reduced.

The configuration of lenses of each of the first to fourth lens units L1b to L4b of the second exemplary embodiment is similar to that of lenses of a corresponding one of the first to fourth lens units L1a to L4a of the first exemplary embodiment.

Third Exemplary Embodiment

A zoom lens according to a third exemplary embodiment illustrated in FIG. 9 is of the same zoom type as that of the second exemplary embodiment illustrated in FIG. 5.

In the third exemplary embodiment illustrated in FIG. 9, a third lens unit L3c includes a lens subunit L3A having a negative refractive power and a lens subunit L3B having a positive refractive power. The lens subunit L3B is configured to move having a movement component in a direction perpendicular to the optical axis so as to perform image stabilization (or adjust displacement of an image). The movement of the lens subunit L3B for image stabilization can be a swing movement (or a rotation movement) around a certain point on the optical axis. The movement of the lens subunit L3B for image stabilization enables the movement of an image within an image plane.

In the third exemplary embodiment, as the third lens unit L3c includes a lens subunit L3A having a negative refractive power and a lens subunit L3B having a positive refractive power, a long back focus can be achieved. Consequently, the zoom lens enables an optical path division unit, such as a 3P prism (or color separation prism), to be provided behind the zoom lens so as to be compatible with a three-CCD (3CCD) photographing camera.

The lens subunit L3A includes a cemented lens including a negative lens and a positive lens.

The lens subunit L3B includes a cemented lens, including a positive lens and a negative lens or including a negative lens and a positive lens, and a positive lens. Consequently, the configuration of an image stabilization lens unit for image-shake correction can be minimized. Accordingly, the reduction of the size and weight of the image stabilization lens unit can be achieved.

There is a large market demand for correction of chromatic aberration in a 3CCD photographing camera requiring high picture quality. In the third exemplary embodiment, the first lens unit L1c includes a negative lens, the optical element GIT, a positive lens, and two meniscus-shaped positive lenses. Consequently, chromatic aberration at the telephoto end can be corrected well. Also, off-axis short-wavelength color flare at the telephoto end can be corrected well.

The second lens unit L2c includes a negative lens, a negative lens, a positive lens, and a negative lens. Consequently, the symmetrical property of the second lens unit L2c can be enhanced. Also, the correction of color at a principal point can be improved. Thus, chromatic aberration of magnification during zooming can be reduced.

The fourth lens unit L4c includes a positive lens and a cemented lens including a negative lens and a positive lens. Consequently, aberration variation during focusing (see arrows B3a, B3b, and B3c) can be reduced.

Fourth Exemplary Embodiment

In a fourth exemplary embodiment illustrated in FIG. 13, when zooming from the wide-angle end to the zoom position at the telephoto end is performed, the variation of magnification is performed by moving (see arrow A4) a second lens unit L2d towards the image side. Then, the movement of an image plane caused by the variation of magnification is compensated for by moving a fourth lens unit L4d along a part of a locus convex towards the object side.

During zooming and during focusing, a first lens unit L1d and a third lens unit L3d are stationary.

Similarly to the first exemplary embodiment, the fourth embodiment employs a rear focus system in which focusing is performed by moving the fourth lens unit L4d along an optical axis (see arrows B4a, B4b, and B4c).

In the fourth exemplary embodiment, the aperture stop SP is located within the third lens unit L3b. Thus, an interval between the second lens unit L2d and the third lens unit L3d can be reduced. Consequently, the entire length of the zoom lens can be reduced.

The configuration of lenses of each of the first to fourth lens units L1d to L4d of the fourth exemplary embodiment is similar to that of lenses of a corresponding one of the first to fourth lens units L1a to L4a of the first exemplary embodiment.

Now, numerical examples 1 to 4 respectively corresponding to the first to fourth exemplary embodiments are described below. In the following description of the numerical examples, "i" designates the ordinal number of each optical surface from the object side. Further, "Ri" denotes a radius of curvature of the i-th (optical) surface, "Di" designates an interval between the i-th surface and the (i+1)-th surface, and "Ni" and "vi" respectively denote a refractive index and an Abbe number of the material of the i-th optical member with respect to d-line light. Additionally, "f", "Fno", and "ω" represent a focal length, an F number, and a semifield angle, respectively.

Each of the numerical examples shows the relative partial dispersion θgF of the material of the optical element GIT.

Additionally, "AL" designates an aspherical surface.

An aspherical shape is expressed by the following equation:

$$x = (h^2/R)/[1+[1-(1+k)(h/R)^2]^{1/2}] + Bh^4 + Ch^6 + Dh^8 + Eh^{10} + A'h^3 + B'h^5 + C'h^7$$

where "x" designates a displacement from a surface vertex along the optical axis in a position at a height "h" from the optical axis, "R" designates a paraxial radius of curvature, "k" designates a conic constant, and each of "B", "C", "D", "E", "A'", "B'", and "C'" is an aspheric coefficient corresponding to an associated order.

Moreover, "e±XX" in each of the aspherical coefficients means "x10^{±XX}".

In each of the numerical examples, a surface closest to the image side (i.e., a surface whose radius of curvature is ∞) constitutes an optical block G.

Furthermore, Table 1 shows the relationship between the conditional expressions and numerical values in the following numerical examples.

NUMERICAL EXAMPLE 1

| f = 6.16-71.28 | Fno = 2.79-3.60 | 2ω = 60.2°-5.8° | |
|---|---|---|---|
| R1 = 81.924 | D1 = 1.10 | N1 = 1.846660 | ν1 = 23.9 |
| R2 = 35.127 | D2 = 1.00 | N2 = 1.635550 | ν2 = 22.7 |
| | | | θgF 0.689 |
| R3 = 42.194 | D3 = 5.00 | N3 = 1.496999 | ν3 = 81.5 |
| R4 = −137.390 | D4 = 0.20 | | |
| R5 = 29.993 | D5 = 2.85 | N4 = 1.772499 | ν4 = 49.6 |
| R6 = 72.783 | D6 = Variable | | |
| R7 = 44.557 | D7 = 0.90 | N5 = 1.834000 | ν5 = 37.2 |
| R8 = 8.282 | D8 = 4.46 | | |
| R9 = −31.204 | D9 = 0.75 | N6 = 1.516330 | ν6 = 64.1 |
| R10 = 17.987 | D10 = 0.70 | | |
| R11 = 14.525 | D11 = 2.00 | N7 = 1.922860 | ν7 = 18.9 |
| R12 = 33.335 | D12 = Variable | | |
| R13 = Stop | D13 = 9.20 | | |
| R14 = 0.050 (AL) | D14 = 2.70 | N8 = 1.583126 | ν8 = 59.4 |
| R15 = 12573.660 | D15 = 2.30 | | |
| R16 = 14.742 | D16 = 0.70 | N9 = 1.84660 | ν9 = 23.9 |
| R17 = 8.587 | D17 = 0.99 | | |
| R18 = 45.955 | D18 = 1.60 | N10 = 1.487490 | ν10 = 70.2 |
| R19 = −112.753 | D19 = 1.16 | | |
| R20 = ∞ | D20 = Variable | | |
| R21 = 20.115 | D21 = 2.50 | N11 = 1.696797 | ν11 = 55.5 |
| R22 = −18.993 | D22 = 0.60 | N12 = 1.846660 | ν12 = 23.9 |
| R23 = −63.555 | D23 = Variable | | |
| R24 = ∞ | D24 = 1.30 | N13 = 1.516330 | ν13 = 64.1 |
| R25 = ∞ | | | |

| | Focal Length | | |
|---|---|---|---|
| Variable Interval | 6.16 | 33.08 | 71.28 |
| D6 | 0.80 | 24.36 | 31.80 |
| D12 | 25.76 | 7.46 | 2.30 |
| D20 | 4.00 | 4.07 | 10.36 |
| D23 | 5.00 | 9.20 | 2.51 |

Aspheric Coefficients

| R14 | k = −1.324040 | B = 1.73859e−04 | C = 2.60178e−07 | D = 3.13757e−07 |
|---|---|---|---|---|
| | E = −3.50587e−10 | A' = −6.165e−05 | B' = −7.379658e−05 | |
| | C' = −4.51262e−06 | | | |

NUMERICAL EXAMPLE 2

| f = 7.05-68.50 | Fno = 1.85-3.00 | 2ω = 53.6°-6.0° | |
|---|---|---|---|
| R1 = 53.313 | D1 = 1.40 | N1 = 1.846660 | ν1 = 23.9 |
| R2 = 21.579 | D2 = 1.20 | N2 = 1.69591 | ν2 = 17.7 |
| | | | θgF 0.686 |
| R3 = 26.702 | D3 = 5.40 | N3 = 1.487490 | ν3 = 70.2 |
| R4 = −145.649 | D4 = 0.20 | | |
| R5 = 22.431 | D5 = 3.90 | N4 = 1.603112 | ν4 = 60.6 |
| R6 = 142.419 | D6 = Variable | | |
| R7 = 67.799 | D7 = 0.80 | N5 = 1.882997 | ν5 = 40.8 |
| R8 = 7.461 | D8 = 3.04 | | |
| R9 = −18.478 | D9 = 0.65 | N6 = 1.487490 | ν6 = 70.2 |
| R10 = 23.370 | D10 = 0.80 | | |
| R11 = 15.221 | D11 = 1.50 | N7 = 1.922860 | ν7 = 18.9 |
| R12 = 43.076 | D12 = Variable | | |
| R13 = 11.065 (AL) | D13 = 3.00 | N8 = 1.693500 | ν8 = 53.2 |
| R14 = 258.471 | D14 = 1.46 | | |
| R15 = Stop | D15 = 2.40 | | |
| R16 = 28.629 | D16 = 0.65 | N9 = 1.846660 | ν9 = 23.9 |
| R17 = 9.217 | D17 = 0.49 | | |
| R18 = 19.220 (AL) | D18 = 2.10 | N10 = 1.583126 | ν10 = 59.4 |
| R19 = −107.249 | D19 = Variable | | |
| R20 = 15.414 | D20 = 2.80 | N11 = 1.834807 | ν11 = 42.7 |
| R21 = −15.151 | D21 = 0.60 | N12 = 1.846660 | ν12 = 23.9 |

-continued

| f = 7.05-68.50 | Fno = 1.85-3.00 | 2ω = 53.6°-6.0° | |
|---|---|---|---|
| R22 = −1548.560 | D22 = Variable | | |
| R23 = ∞ | D23 = 1.10 | N13 = 1.500000 | ν13 = 60.0 |
| R24 = ∞ | D24 = 0.80 | N14 = 1.550000 | ν14 = 70.0 |
| R25 = ∞ | D25 = 0.73 | | |
| R26 = ∞ | D26 = 0.56 | N15 = 1.500000 | ν15 = 60.0 |
| R27 = ∞ | | | |

| | Focal Length | | |
|---|---|---|---|
| Variable Interval | 7.05 | 32.37 | 68.50 |
| D6 | 0.79 | 17.64 | 22.39 |
| D12 | 22.10 | 5.24 | 0.49 |
| D19 | 5.96 | 3.79 | 11.43 |
| D22 | 6.00 | 8.18 | 0.53 |

Aspheric Coefficients

| R13 | k = −5.63151e−01 | B = −1.42807e−05 | C = −8.61976e−08 |
|---|---|---|---|
| | D = −9.72875e−10 | | |
| R18 | k = 4.82109e+00 | B = −9.90828e−05 | C = 1.01528e−07 |
| | D = −3.98910e−09 | | |

NUMERICAL EXAMPLE 3

| f = 3.94-78.26 | Fno = 1.66-2.22 | 2ω = 59.9°-3.4° | |
|---|---|---|---|
| R1 = 266.939 | D1 = 2.00 | N1 = 1.806100 | ν1 = 33.3 |
| R2 = 42.429 | D2 = 0.95 | N2 = 1.635550 | ν2 = 22.7 |
| | | | θgF 0.689 |
| R3 = 47.938 | D3 = 7.55 | N3 = 1.496999 | ν3 = 81.5 |
| R4 = −187.942 | D4 = 0.20 | | |
| R5 = 44.978 | D5 = 5.40 | N4 = 1.487490 | ν4 = 70.2 |
| R6 = 645.217 | D6 = 0.20 | | |
| R7 = 43.053 | D7 = 3.55 | N5 = 1.603112 | ν5 = 60.6 |
| R8 = 116.819 | D8 = Variable | | |
| R9 = 49.994 | D9 = 0.85 | N6 = 1.882997 | ν6 = 40.8 |
| R10 = 7.770 | D10 = 3.96 | | |
| R11 = −22.594 | D11 = 0.75 | N7 = 1.772499 | ν7 = 49.6 |
| R12 = 59.075 | D12 = 0.10 | | |
| R13 = 16.815 | D13 = 3.05 | N8 = 1.846660 | ν8 = 23.9 |
| R14 = −76.793 | D14 = 0.70 | N9 = 1.696797 | ν9 = 55.5 |
| R15 = 49.023 | D15 = Variable | | |
| R16 = Stop | D16 = 5.90 | | |
| R17 = −50.039 | D17 = 0.65 | N10 = 1.882997 | ν10 = 40.8 |
| R18 = 13.048 | D18 = 2.65 | N11 = 1.805181 | ν11 = 25.4 |
| R19 = −1537.759 | D19 = 0.50 | | |
| R20 = 13.915 (AL) | D20 = 3.80 | N12 = 1.583126 | ν12 = 59.4 |
| R21 = −40.400 | D21 = 0.80 | N13 = 1.698947 | ν13 = 30.1 |
| R22 = 17.500 | D22 = 1.35 | | |
| R23 = 48.123 | D23 = 2.20 | N14 = 1.804000 | ν14 = 46.6 |
| R24 = −38.500 | D24 = Variable | | |
| R25 = 35.942 | D25 = 2.25 | N15 = 1.603112 | ν15 = 60.6 |
| R26 = −50.970 | D26 = 0.20 | | |
| R27 = 21.028 | D27 = 0.80 | N16 = 1.805181 | ν16 = 25.4 |
| R28 = 12.033 | D28 = 3.45 | N17 = 1.496999 | ν17 = 81.5 |
| R29 = 3986.989 | D29 = Variable | | |
| R30 = ∞ | D30 = 0.43 | N18 = 1.516800 | ν18 = 64.2 |
| R31 = ∞ | D31 = 2.05 | N19 = 1.552320 | ν19 = 63.4 |
| R32 = ∞ | D32 = 2.03 | | |
| R33 = ∞ | D33 = 0.50 | N20 = 1.556710 | ν20 = 58.6 |
| R34 = ∞ | D34 = 17.50 | N21 = 1.516800 | ν21 = 64.2 |
| R35 = ∞ | | | |

| | Focal Length | | |
|---|---|---|---|
| Variable Interval | 3.94 | 25.39 | 78.26 |
| D8 | 0.90 | 30.95 | 39.43 |
| D15 | 42.03 | 11.98 | 3.50 |
| D24 | 9.11 | 5.37 | 9.57 |
| D29 | 3.00 | 6.75 | 2.54 |

NUMERICAL EXAMPLE 4

| f = 7.10-75.00 | Fno = 1.88-3.30 | 2ω = 53.4°-5.4° | |
|---|---|---|---|
| R1 = 47.853 | D1 = 1.40 | N1 = 1.846660 | ν1 = 23.9 |
| R2 = 20.369 | D2 = 1.25 | N2 = 1.635550 | ν2 = 22.7 |
| | | | θgF 0.689 |
| R3 = 27.638 | D3 = 4.85 | N3 = 1.487490 | ν3 = 70.2 |
| R4 = −131.563 | D4 = 0.20 | | |
| R5 = 20.796 | D5 = 3.90 | N4 = 1.603112 | ν4 = 60.6 |
| R6 = 128.102 | D6 = Variable | | |
| R7 = 86.379 | D7 = 0.70 | N5 = 1.882997 | ν5 = 40.8 |
| R8 = 7.061 | D8 = 2.71 | | |
| R9 = −17.320 | D9 = 0.67 | N6 = 1.487490 | ν6 = 70.2 |
| R10 = 15.281 | D10 = 0.84 | | |
| R11 = 13.459 | D11 = 1.51 | N7 = 1.922860 | ν7 = 18.9 |
| R12 = 38.725 | D12 = Variable | | |
| R13 = 11.503 (AL) | D13 = 3.10 | N8 = 1.693500 | ν8 = 53.2 |
| R14 = −78.793 | D14 = 1.50 | | |
| R15 = Stop | D15 = 2.50 | | |
| R16 = 42.214 | D16 = 0.60 | N9 = 1.846660 | ν9 = 23.9 |
| R17 = 9.101 | D17 = 0.55 | | |
| R18 = 20.281 (AL) | D18 = 2.20 | N10 = 1.583126 | ν10 = 59.4 |
| R19 = −53.458 | D19 = Variable | | |
| R20 = 15.695 | D20 = 2.70 | N11 = 1.834807 | ν11 = 42.7 |
| R21 = −15.488 | D21 = 0.60 | N12 = 1.846660 | ν12 = 23.9 |
| R22 = −259.494 | D22 = 2.50 | | |
| R23 = ∞ | D23 = 1.12 | N13 = 1.500000 | ν13 = 60.0 |
| R24 = ∞ | D24 = 0.80 | N14 = 1.550000 | ν14 = 70.0 |
| R25 = ∞ | D25 = 0.73 | | |
| R26 = ∞ | D26 = 0.56 | N15 = 1.500000 | ν15 = 60.0 |
| R27 = ∞ | | | |

| | Focal Length | | |
|---|---|---|---|
| Variable Interval | 7.10 | 32.34 | 75.00 |
| D6 | 0.79 | 15.82 | 20.06 |
| D12 | 19.77 | 4.73 | 0.50 |
| D19 | 8.31 | 5.30 | 13.94 |

Aspheric Coefficients

| R13 | k = 1.29236e−01 | B = −9.15267e−05 | C = −7.44722e−07 |
|---|---|---|---|
| | D = −4.48409e−10 | | |
| R18 | k = 3.68174e+00 | B = −3.79563e−05 | C = 1.3671e−06 |
| | D = 2.81549e−08 | | |

TABLE 1

| Conditional Expression | Numerical Example 1 | Numerical Example 2 | Numerical Example 3 | Numerical Example 4 |
|---|---|---|---|---|
| (1) | 0.793 | 0.771 | 0.793 | 0.793 |
| (2) | 2.1 | 3.4 | 2.0 | 5.0 |
| (3) | 30 | 16 | 47 | 15 |
| (4) | −11 | −9 | −17 | −7 |

Next, an exemplary embodiment of a digital still camera using the zoom lens, which has been described in the foregoing description of at least one of the exemplary embodiments, as a photographing optical system is described below with reference to FIG. 17.

As illustrated in FIG. 17, the digital still camera includes a camera body 20 and a photographing optical system 21, for example, which includes a zoom lens described in any of the foregoing description of the numerical examples 1 to 4. The digital still camera further includes a solid-state image sensor (photoelectric conversion element) 22, such as a CCD sensor or a COMS sensor, which is incorporated in the camera body 20 and configured to receive an object image formed by the photographing optical system 21.

The digital still camera further includes a memory 23 configured to store information corresponding to the object image photoelectrically converted by the solid-state image sensor 22. The digital still camera further includes a viewfinder 24, which has a liquid crystal display panel and is used to observe an object image formed on the solid-state image sensor 22.

Thus, a compact high-optical-performance image pickup apparatus can be implemented by applying the zoom lens according to each of the exemplary embodiments of the invention to an image pickup apparatus, such as a digital still camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-124052 filed Apr. 27, 2006, which is hereby incorporated by reference herein in its entirety.

What is claimed is:

1. A zoom lens comprising, in order from an object side to an image side:
    a first lens unit having a positive refractive power;
    a second lens unit having a negative refractive power; and
    an image-side lens unit,
    wherein an interval between the first lens unit and the second lens unit varies during zooming,
    wherein the first lens unit includes an optical element having a positive refractive power and made of a solid material having an Abbe number (vd) and a relative partial dispersion ($\theta gF$) satisfying the following condition:

$0.755 < \theta gF - (-1.665 \times 10^{-7} \cdot vd^3 + 5.213 \times 10^{-5} \cdot vd^2 - 5.656 \times 10^{-3} \cdot vd) < 1.011$, wherein a focal length of the first lens unit (f1) and a focal length of the zoom lens at a telephoto end (ft) satisfy the following condition:

$1.6 < (ft/f1)^2 < 5.6$, and wherein a focal length of the optical element (fGIT) in a case where both of two refractive surfaces of the optical element are in contact with air satisfies the following condition:

$5 < fGIT/f1 < 80$.

2. The zoom lens according to claim 1, wherein the image-side lens unit includes a third lens unit having a positive refractive power, and a fourth lens unit having a positive refractive power.

3. The zoom lens according to claim 1, wherein the first lens unit includes, in order from the object side to the image side, a meniscus-shaped negative lens having a concave surface facing the image side, and a positive lens having a convex surface facing the object side, and
    wherein the optical element is located between the negative lens and the positive lens.

4. The zoom lens according to claim 1, wherein a radius of curvature of an object-side surface of the optical element (Ra) and a radius of curvature of an image-side surface of the optical element (Rb) satisfy the following condition:

$-30 < (Ra+Rb)/(Ra-Rb) < -4$.

5. The zoom lens according to claim 1, wherein the zoom lens is adapted to form an image on a photoelectric conversion element.

6. An image pickup apparatus comprising:
    the zoom lens according to claim 1; and
    a photoelectric conversion element configured to receive an image formed by the zoom lens.

* * * * *